UNITED STATES PATENT OFFICE.

JOHN W. HORNSEY, OF SUMMIT, NEW JERSEY.

PROCESS FOR THE RECOVERY OF POTASSIUM SALTS FROM SOLUTIONS CONTAINING THE SAME AS WELL AS OTHER SALTS.

1,380,383.　　　　　Specification of Letters Patent.　　Patented June 7, 1921.

No Drawing.　　Application filed June 21, 1918. Serial No. 241,230.

*To all whom it may concern:*

Be it known that I, JOHN W. HORNSEY, a citizen of the United States, and a resident of Summit, county of Union, New Jersey, have invented a new and Improved Process for the Recovery of Potassium Salts from Solutions Containing the Same as Well as other Salts, of which the following is a specification.

The object of my invention is to recover potassium salts from solutions in which they are mingled with other salts, as, for example, in Searles Lake brine, obtained from Searles Lake, San Bernardino county, California, which contains potassium chlorid, sodium chlorid, sodium sulfate, sodium carbonate, sodium bicarbonate and borax or sodium tetraborate, with minute quantities of other ingredients.

The method consists in subjecting the solution to evaporation at a relatively high temperature and preferably under pressure until the solution is saturated for its temperature with the potassium salt or salts. A large part of the contaminating salts are thrown out of solution during this process of evaporation, either because their solubility is less than that of the potassium salts at the temperature employed for evaporation, or because they are present in larger quantities. The solution is then separated from the salts so thrown out by any suitable method. The separated solution is then cooled preferably to substantially atmospheric temperatures. This results in the precipitation of a crop of crystals carrying a relatively high percentage of potassium salts. These crystals are then separated from the solution, and either marketed as such or refined in any well-known manner, such as recrystallization or by the methods described in my co-pending applications, Serial Nos. 22,105 and 22,106.

The residual solution separated from the crop of crystals precipitated upon cooling may again be subjected to evaporation followed by cooling as above, or it may be added to fresh brine to recover added quantities of potassium salts.

I have found that when the process of evaporation is carried on under comparatively high pressures such, for example, as 50 to 100 lbs. and the temperatures or boiling points corresponding thereto, a very much larger percentage of the contaminating salts is thrown out during evaporation, and the percentage of potassium salts left in the solution is thereby relatively increased. Consequently, upon cooling the separated solution a larger and purer crop of potassium salts is recovered. This result is due to the fact that the solubility of potassium salts, such as potassium chlorid, potassium sulfate, potassium nitrate, is greater at the higher temperatures, above the boiling point of the solution at atmospheric pressure, (which in the case of Searles Lake brines averages about 108° C.) than at lower temperatures, whereas the solubility of many of the contaminating salts usually present in solutions from which it is desired to separate potassium salts does not increase correspondingly at the higher temperatures. The process is of advantage even though all of the contaminating salts do not follow this rule. This is found very useful in the case of the Searles Lake brine, although the borax therein contained is much more soluble at high temperatures than at low, and will therefore be substantially precipitated with the potassium chlorid upon cooling the solution, provided the solution be cooled sufficiently.

Another advantage of this process is that, inasmuch as the capacity of an evaporating apparatus increases with the difference in temperature between the heating medium and the solution, this method of operating under pressure, since it provides a considerably greater temperature difference than that commonly used, results in an increased capacity of the evaporating apparatus employed.

For the purposes of fuel economy the preliminary steps of evaporation may be carried on in the well-known vacuum evaporating apparatus and completed under pressure in one or more pressure evaporators, which may, if desired, be connected in series with the preliminary vacuum pans.

It will be obvious that many variations may be made in the details of the foregoing process without departing from the spirit and scope of my invention.

What I claim is:

1. The process of recovering potassium salts from solutions containing them and contaminating salts, which comprises evaporating the solution under pressure at a temperature above the boiling point of the solution at atmospheric pressure until a large part of the contaminating salts are thrown out of solution, separating the residual solution from the contaminating salts so deposited, and cooling the residual solution to precipitate the potassium salts.

2. The process of recovering potassium salts from solutions containing them and contaminating salts, which comprises evaporating the solution under pressure at temperatures above the boiling point of the solution at atmospheric pressure until a large part of the contaminating salts are thrown out of solution, separating the residual solution from the contaminating salts so deposited, and cooling substantially to atmospheric temperature the residual solution to precipitate the potassium salts.

3. The process of recovering potassium salts from solutions containing them and contaminating salts, which comprises evaporating the solution under pressure at a temperature above the boiling point of the solution at atmospheric pressure until the solution is saturated for its temperature with the potassium salt or salts, separating the residual solution from the contaminating salts thereby deposited, and cooling the residual solution to precipitate the potassium salts.

4. The process of recovering potassium salts from solutions containing them and contaminating salts, which comprises evaporating the solution at temperatures above the boiling point of the solution at atmospheric pressure until the solution is saturated for its temperature with the potassium salt or salts, separating the residual solution from the contaminating salts thereby deposited, and cooling the residual solution to precipitate the potassium salts.

JOHN W. HORNSEY.